(12) United States Patent
Perkins et al.

(10) Patent No.: US 8,361,193 B2
(45) Date of Patent: Jan. 29, 2013

(54) SYSTEM AND METHOD FOR ELECTROSTATIC AIR FILTERING IN AN AUTOMOTIVE VEHICLE

(75) Inventors: William Paul Perkins, Dearborn, MI (US); Renata Michaela Arsenault, Plymouth, MI (US); Jimmy H. Kapadia, Ottawa Hills, OH (US); Steven A. Daleiden, Milan, MI (US); Alan McDonald, West Bloomfield, MI (US); Richard Michael Isaacs, Saline, MI (US); Allen Dennis Dobryden, Ann Arbor, MI (US); Matthew Fleming, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 440 days.

(21) Appl. No.: 12/687,470

(22) Filed: Jan. 14, 2010

(65) Prior Publication Data

US 2011/0168463 A1    Jul. 14, 2011

(51) Int. Cl.
 *B03C 3/68* (2006.01)
(52) U.S. Cl. ............ 95/3; 55/385.3; 95/79; 96/19; 96/77
(58) Field of Classification Search .................... 95/2, 3, 95/79; 96/18, 19, 77; 55/385.3
See application file for complete search history.

(56) References Cited

U.S. PATENT DOCUMENTS

| 3,738,088 | A | * | 6/1973 | Colosimo ........................ 96/26 |
| 5,433,772 | A | * | 7/1995 | Sikora ............................. 96/87 |
| 5,501,716 | A |   | 3/1996 | Chiba et al. |
| 6,602,330 | B2 |   | 8/2003 | Allen |
| 6,773,477 | B2 | * | 8/2004 | Lindsay ........................ 55/385.3 |
| 7,025,806 | B2 |   | 4/2006 | Coppom et al. |
| 2004/0065195 | A1 | * | 4/2004 | Gogins ............................... 95/8 |

OTHER PUBLICATIONS

"Electric Car", Microsoft Encarta Online Encyclopedia 2009 article, http://encarta.msn.com/encyclopedia_761580732/Electric_Car.html, © 1997-2009, Microsoft Corporation, pp. 1-6.
"Electrostatic Precipitator", Wikipedia article, http://en.wikipedia.org/wiki/electrostatic_precipitator, Jun. 18, 2008, Wikimedia Foundation, Inc., pp. 1-3.
Ladrech, Frederic, et al., "Improved Air Quality In-Cabin_ The Electrostatic Filtration", Technical Paper No. F2006D074, Valeo Climate Control, France, VTT Industrial Systems, Finland, pp. 1-10.
Ryan, "Saab Invention Gives Pollen-Free Zones for Allergy Sufferers", SaabHistory.com article, http://www.saabhistory.com/2001/05/21/saab-invention-gives-pollen-free-zones-for-allergy-sufferers/, May 21, 2001, pp. 1-7.

* cited by examiner

*Primary Examiner* — Richard L Chiesa
(74) *Attorney, Agent, or Firm* — David B. Kelley; Brooks Kushman P.C.

(57) ABSTRACT

A system and method is provided for electrostatic air filtering in automotive vehicles, such as electric and hybrid electric vehicles. The system includes an electrical distribution system and an electrostatic filtering system having discharge electrodes and an accumulation electrode. The distribution system is in high-voltage electrical communication with the filtering system as well as an electric motor and a high-voltage energy storage device in the vehicle. In operation, the distribution system distributes high-voltage electric power to the filtering system. The filtering system receives the high-voltage electric power to generate a high-voltage electrostatic potential between the accumulation electrode and the discharge electrodes to remove particulates from air flowing through a region of the electrostatic filtering system.

20 Claims, 3 Drawing Sheets

SYSTEM AND METHOD FOR ELECTROSTATIC AIR FILTERING IN AN AUTOMOTIVE VEHICLE

BACKGROUND

1. Technical Field

System and method for electrostatic air filtering in an automotive vehicle.

2. Background Art

Air quality in a passenger compartment of a motor vehicle is a concern not only for passengers in the motor vehicle, but also governments, organizations, and businesses that have an interest in providing clean air to the passengers. However, debris, organisms, dust, and other particulates have continued to enter and decrease the quality of the air in passenger compartments of motor vehicles. For example, carbon particulates in exhaust from trucks have been known to enter the passenger compartment from outside the vehicle and decrease the air quality in the passenger compartment. In addition, air recycled within the passenger compartment influences the air quality in the passenger compartment. For example, agitating or stirring up dust inside the vehicle can contaminate the air in the passenger compartment. Effects on passengers from unclean air include allergic reactions, damage to lungs and airways, and long-term health deterioration.

SUMMARY

A system and method is provided for electrostatic air filtering in an automotive vehicle, such as an electric vehicle. The automotive vehicle includes a high-voltage energy storage device, an electric motor for powering the vehicle, and a passenger compartment. The system includes an electrostatic filtering system and an electrical distribution system in the automotive vehicle. The distribution system is in high-voltage electrical communication with the filtering system, the electric motor, and the high-voltage energy storage device. In operation, the distribution system distributes high-voltage electric power from at least one of the electric motor and the high-voltage energy storage device to the filtering system. The filtering system includes a plurality of discharge electrodes and at least one accumulation electrode. In operation, the filtering system receives the high-voltage electric power from the distribution system to generate a high-voltage electrostatic potential between the accumulation electrode and the discharge electrodes. The filtering system uses the electrostatic potential to electrostatically transfer particulates from air flowing through a region of the electrostatic voltage potential to the accumulation electrode.

The vehicle may be a hybrid electric vehicle. The hybrid electric vehicle includes the high-voltage energy storage device, the electric motor, the passenger compartment as well as an engine and an electric generator. The electrical distribution system is in high-voltage electrical communication with the electric generator as well as the filtering system, the electric motor, and the high-voltage energy storage device. In operation, the distribution system distributes high-voltage electric power from at least one of the electric generator, the electric motor, and the high-voltage energy storage device to the filtering system.

DETAILED DESCRIPTION

Embodiments of the present invention generally comprise a system and method for electrostatic air filtering in an automotive vehicle. The vehicle may be any type of vehicle that provides high-voltage electric power, such as a plug-in electric vehicle, a hybrid electric vehicle (HEV), a plug-in hybrid electric vehicle, or a hybrid fuel cell electric vehicle (FCEV). Electrostatic air filtering in the automotive vehicle can be controlled in an effort to reduce or minimize a presence of particulates, such as debris, organisms, dust, mold, and other airborne particles, from entering a passenger compartment in the vehicle.

Figure 1:
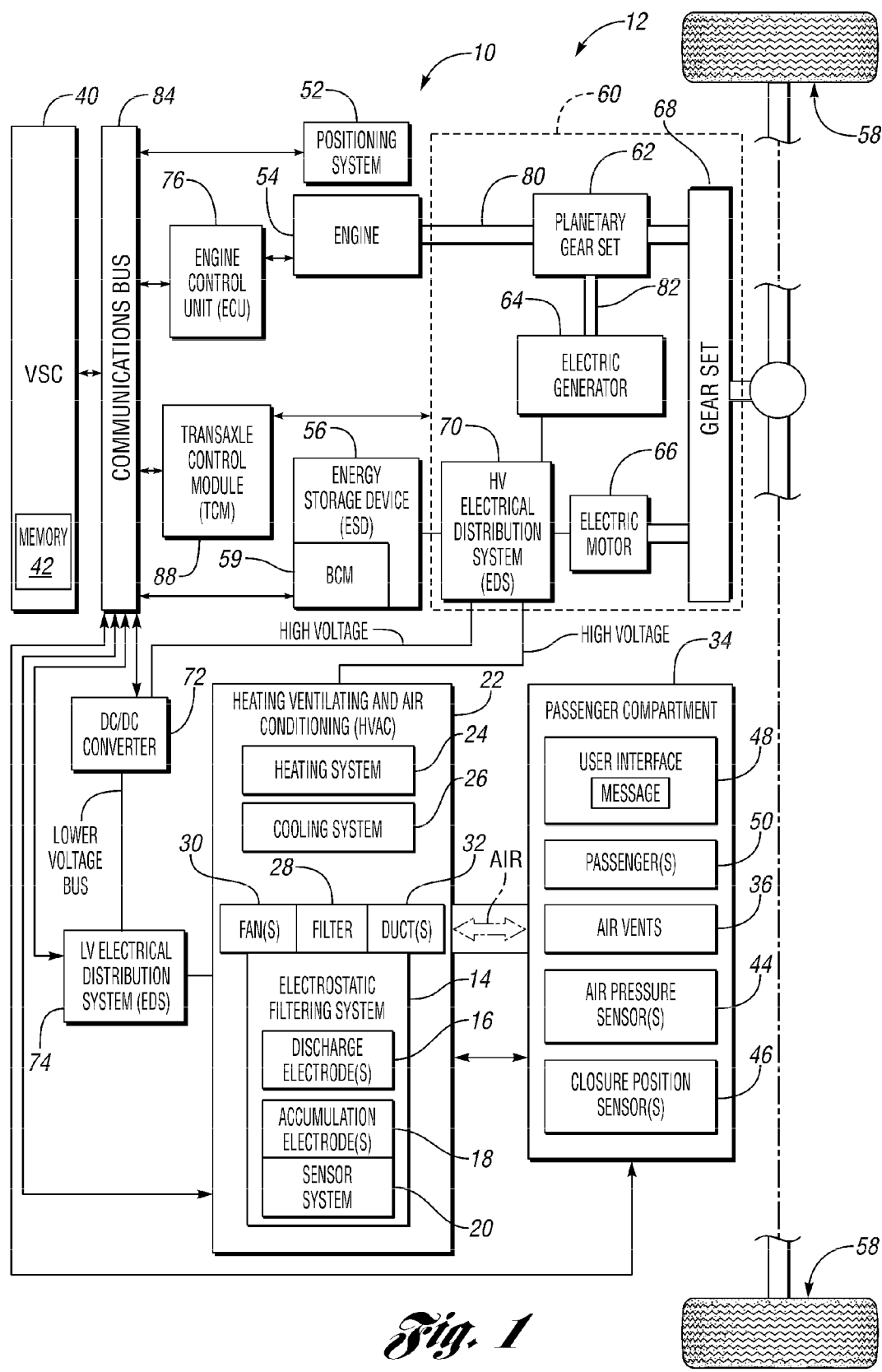
FIG. 1 is a schematic diagram illustrating a hybrid electric vehicle including a system for electrostatic air filtering in the vehicle.

With reference to FIG. 1, a system 10 for electrostatic air filtering in an automotive vehicle 12 is generally provided. The system 10 of FIG. 1 is shown integrated with a powertrain of a parallel/series hybrid electric vehicle (PSHEV). However, the system 10 may be integrated with other powertrain configurations, such as a series hybrid electric vehicle (SHEV), a parallel hybrid electric vehicle (PHEV), or a plug-in electric vehicle. The system 10 and its method of operation are described in a general fashion to facilitate an understanding of various aspects of the present invention.

As illustrated in FIG. 1, the system 10 includes an electrostatic filtering system 14. The filtering system 14 has a plurality of discharge electrodes 16 and at least one accumulation electrode 18. In operation, the filtering system 14 receives high-voltage electric power to generate a high-voltage electrostatic potential between the accumulation electrode 18 and the discharge electrodes 16. Airborne particles in air flowing through a region of the electrostatic voltage potential are electrostatically transferred to the accumulation electrode 18. As the filtering system 14 transfers particulates to the accumulation electrode 18, the particulates accumulate or build up on the accumulation electrode 18. Transferring particulates from the air to the accumulation electrode 18 using the electrostatic potential may be referred to as electrostatic air filtering.

The filtering system 14 has a rate of air filtering that corresponds to a rate that particulates are removed from the air flowing through the region of the electrostatic voltage potential. The filtering system 14 can increase or decrease the rate of air filtering depending on how the filtering system 14 is commanded to operate.

As shown in FIG. 1, the electrostatic filtering system 14 may include a particulate sensor system 20. The sensor system 20 senses a first amount of particulates in air flowing upstream of the accumulation electrode 18. Similarly, the sensor system 20 senses a second amount of particulates in air flowing downstream of the accumulation electrode 18. Furthermore, the sensor system 20 generates a particulate signal determined by or embedded with the first and second amounts of particulates. Based on the first and second amounts of particulates, the filtering system 14 or other device in the vehicle 12 can determine whether the accumulation electrode 18 needs to be cleaned. The particulate sensor system 20 may include one or more optical particle counters. The optical particle counters may sample the air flowing upstream and downstream of the accumulation electrode 18 to sense the first and second amounts of particulates.

With continuing reference to FIG. 1, the filtering system 14 may be integrated with a heating ventilating and air conditioning (HVAC) system 22 in the vehicle 12 to facilitate air filtering. The HVAC system 22 may include a heating system 24, a cooling system 26, or both the heating and cooling systems 24, 26. In addition, the HVAC system 22 may include a filter 28 and a fan 30. The filter 28 filters air flowing through the HVAC system 22 before the air flows into the electrostatic filtering system 14. For example, the filter 28 may be a thin fiber filter. The fan 30 moves or propels air through the filter 28, through the filtering system 14, and into a passenger compartment 34 in the vehicle 12.

FIG. 1 shows the filtering system 14 inside the HVAC system 22. However, the filtering system 14 may be positioned outside the HVAC system 22 while remaining in airflow communication with the HVAC system 22.

Referring again to FIG. 1, the HVAC system 22 may include one or more ducts 32. The ducts 32 channel the air through the filter 28, through the filtering system 14, and into the passenger compartment 34. For example, the ducts 32 may channel the air into the passenger compartment 34 through air vents 36 in the passenger compartment 34.

With continuing reference to FIG. 1, the system 10 may include a controller 40 or some other type of programmable logic device to control various components in the vehicle 12, such as the filtering system 14 and the HVAC system 22. The controller 40 of FIG. 1 is shown as a combination of a vehicle system controller (VSC), a powertrain control module (PCM), and an air filtering controller. The combination of the VSC, the PCM, and the air filtering controller is hereinafter referenced as a "VSC" having reference numeral 40. Although the VSC 40 is shown as a single hardware device, the VSC 40 may include multiple controllers in the form of multiple hardware devices, or multiple software controllers within one or more hardware devices.

The system 10 may include a computer-readable storage medium 42 (hereinafter "memory") to store a computer program or algorithm embedded or encoded with the method. In addition to storing the computer program or algorithm, the memory 42 can store data or information about the various operating conditions or components in the vehicle 12 to implement the method. The memory 42 can be part of the VSC 40 as shown in FIG. 1. However, the memory 42 may be positioned in any suitable portion in the vehicle 12 that the VSC 40 can access.

As illustrated in FIG. 1, the passenger compartment 34 may include an air pressure sensor 44, a closure position sensor 46, a user interface 48, and air vents 36. The air vents 36 receive air from the electrostatic filtering system 14 via the ducts 32 in the HVAC system 22 and direct the air in the passenger compartment 34. For example, the air vents 36 may direct the air toward one or more passengers 50 in the passenger compartment 34.

The VSC 40 may control the air filtering of the filtering system 14 based on whether a closure in the vehicle 12 is open. Closure refers to a window, door, moon roof, sun roof, or other type of sealing device for an opening in the vehicle 12. The VSC 40 may control air filtering differently when the closure is open than when all of the closures in the vehicle 12 are closed. For example, the VSC 40 may reduce a rate of air filtering when the closure is open since the HVAC system 22 cannot easily control the amount of particulates entering the passenger compartment 34 through the closure. An open closure refers to a window, door, moon roof, sun roof, etc. that is not closed. A closure that is not closed refers to a closure that is partially open or fully open.

The air pressure sensor 44, the closure position sensor 46, or both can be used to provide information to indicate whether a closure in the vehicle 12 is open. Such information can be stored in the memory 42. Based on whether a closure in the vehicle 12 is open, the VSC 40 can control a rate of air filtering of the filtering system 14. For example, if the VSC 40 determines that a closure in the vehicle 12 is open, then the filtering system 14 may reduce the rate of air filtering to an idle state, such as zero so that no electrostatic air filtering occurs. The VSC 40 may command the filtering system 14 to reduce the rate of air filtering to decrease the amount of electric power that the vehicle 12 uses. In addition, the rate of air filtering may be decreased in an effort to reduce particulate buildup on the accumulation electrode 18. Reducing particulate buildup on the accumulation electrode 18 can increase the efficiency of the air filtering.

Alternatively, the VSC 40 may command the filtering system 14 to increase the rate of air filtering when a closure in the vehicle 12 is open. The rate of air filtering may be increased to compensate for increased airborne particulates entering the passenger compartment 34 through the closure(s) of the vehicle 12.

The air pressure sensor 44 may be used to sense whether a closure in the vehicle 12 is open. In operation, the air pressure sensor 44 senses air pressure in the passenger compartment 34 and generates an air pressure signal embedded or encoded with the air pressure. The VSC 40 can receive and process the air pressure signal to obtain the sensed air pressure. The sensed air pressure can be stored in the memory 42. Based on the sensed air pressure, the VSC 40 can determine whether a closure in the automotive vehicle is open. For example, the VSC 40 can compare the sensed air pressure to a predetermined pressure range stored in memory 42. If the sensed air pressure is outside the predetermined pressure range, then the VSC 40 can decrease the rate of air filtering of the filtering system 14. Alternatively, the VSC 40 can compare an internal air pressure in the passenger compartment 34 to an external air pressure. Based on the internal and external air pressures, the VSC 40 can determine whether a closure in the vehicle 12 is open. For example, the VSC 40 may determine a pressure difference between the internal and external air pressures and compare the pressure difference to a predetermined pressure level stored in memory 42. The predetermined pressure level may depend on current settings of the HVAC system 22. In such an example, if the pressure difference is below the predetermined pressure level, then the VSC 40 can determine that a closure in the vehicle 12 is open.

Like the air pressure sensor 44, the closure position sensor 46 may be used to sense whether a closure in the vehicle 12 is open. For example, the closure position sensor 46 may be a window position sensor that senses whether a window in the vehicle 12 is open. In another example, the closure position sensor 46 may be a door position sensor that senses whether a door in the vehicle 12 is open. In operation, the closure position sensor 46 senses a position of a closure in the vehicle 12. The position of a closure can be stored in the memory 42. The vehicle 12 may have the closure position sensor 46 for each closure that can open and close in the vehicle 12. Based on the position of the one or more closures, the closure position sensor 46 generates a closure signal embedded or encoded with information indicating the position of the one or more closures in the vehicle 12. The VSC 40 can receive and process the closure signal to determine whether a closure in the vehicle 12 is open. For example, if the VSC 40 determines that a closure in the vehicle 12 is in an open position, then the VSC 40 can decrease the rate of air filtering of the filtering system 14.

The VSC 40 and the user interface 48 can control or calibrate the electrostatic filtering system 14, the HVAC system 22, as well as various components in the passenger compartment 34, such as the air pressure sensor 44, the closure position sensor 46, and the air vents 36. In addition, the VSC 40 can receive the particulate signal from the sensor system 20 to obtain the first and second amounts of particulates. Furthermore, the VSC 40 can determine a level of particulates that has accumulated on the accumulation electrode 18 based on the first and second amounts of particulates. The first and second amounts of particulates can be stored in the memory 42.

The VSC 40 can command the user interface 48 to indicate or display the level of particulates to the passengers 50. For example, the user interface 48 may provide a message to the passengers 50 instructing one of the passengers 50 to clean the accumulation electrode 18. Alternatively, the user interface 48 may provide a message indicating that the filtering system 14 is cleaning the accumulation electrode 18 and therefore the filtering system 14 has momentarily paused air filtering in the vehicle 12. In addition, one of the passengers 50 can command the VSC 40 to switch the electrostatic filtering system 14 between an off mode and an on mode through the user interface 48. In such an example, the VSC 40 may allow the filtering system 14 to operate in the on mode even if the VSC 40 determines that one of the closures is not closed.

Referring again to FIG. 1, the vehicle 12 may include a positioning system 52, such as a global positioning system (GPS) or other suitable positioning-based system. The positioning system 52 can generate a vehicle position signal embedded or encoded with information indicating a geographical position of the vehicle 12. For example, the geographic position of the vehicle 12 may be represented as coordinates where the vehicle 12 is positioned. The VSC 40 can receive and process the vehicle position signal to obtain the geographical position of the vehicle 12. The geographical position of the vehicle 12 can be stored in the memory 42. Based on the geographical position, the VSC 40 can control the rate that the filtering system 14 transfers particulates to the accumulation electrode 18. For example, the VSC 40 may decrease the rate of air filtering of the filtering system 14 if the vehicle 12 is located in a geographic area having relatively good air quality, such as on a paved road or a city known to have good air quality. In contrast, the VSC 40 may increase the rate of air filtering if the vehicle 12 is located in a geographic area having relatively poor air quality, such as on a dirt road or a city known to have poor air quality.

As illustrated in FIG. 1, the vehicle 12 includes an engine 54, an energy storage device (ESD) 56 (also referenced as "battery"), and drive wheels 58. The engine 54 can be an internal combustion engine (ICE). However, other types of transaxle-power generation unit designs may be used depending on the configuration of the vehicle 12. The ESD 56 of FIG. 1 can be a high voltage battery that outputs and stores high-voltage electric power. Alternatively, the ESD 56 may be an ultra-capacitor or a mechanical flywheel unit, which, like the high voltage battery, are capable of both storing and outputting energy to propel the drive wheels 58. Other types of energy storage devices and output devices can be used with the engine 54 to provide high-voltage electric power to the filtering system 14 in the vehicle 12. The ESD 56 of FIG. 1 includes a controller, such as a battery control module (BCM) 59, to control electric power to and from the ESD 56. For example, the BCM 59 can control charging of the ESD 56.

As shown in FIG. 1, the vehicle 12 includes a transaxle 60. The transaxle 60 includes a planetary gear set 62, an electric generator 64, an electric motor 66, a gear set 68, and a high-voltage electrical distribution system (EDS) 70 (hereinafter "high-voltage EDS"). The transaxle 60 is coupled between the drive wheels 58 and the engine 54 and battery 56 to control how and when power is transferred to the electrostatic filtering system 14, the drive wheels 58, and/or the battery 56. The transaxle 60 of FIG. 1 includes one or more controllers, such as a transaxle control module (TCM) 88, configured to control specific components within the transaxle 60. For example, the TCM 88 controls the electric generator 64 and the electric motor 66. The motor 66 and the electric generator 64 can both operate as motors to output torque. In addition, each can operate as a generator that outputs high-voltage electric power to the high-voltage EDS 70.

As illustrated in FIG. 1, the planetary gear set 62 of the transaxle 60 mechanically connects the engine 54 and the electric generator 64. Furthermore, the planetary gear set 62 includes a ring gear, a carrier, planet gears, and a sun gear. Alternatively, the planetary gear set 62 may be a different type of gear set or transmission for coupling the engine 54 to the electric generator 64.

As shown in FIG. 1, the high-voltage EDS 70 is in high-voltage electrical communication with a DC-to-DC converter 72 (hereinafter "DC/DC converter"), the filtering system 14, the HVAC system 22, the electric generator 64, the electric motor 66, and the battery 56. The DC/DC converter 72 converts the high-voltage electric power from the high-voltage EDS 70 to low-voltage electric power.

Referring again to FIG. 1, the high-voltage EDS 70 distributes high-voltage electric power to and from the electric generator 64, the electric motor 66, the battery 56, the filtering system 14, and the HVAC system 22. For example, the high-voltage EDS 70 can distribute the high-voltage electric power to the filtering system 14 from the electric generator 64, the electric motor 66, the battery 56, or a combination thereof. In such an example, the high-voltage EDS 70 may distribute high-voltage electric power to both the electric motor 66 and the filtering system 14 to provide electrostatic air filtering as the electric motor 66 drives the drive wheels 58. Furthermore, the high-voltage EDS 70 can distribute high-voltage electric power to the DC/DC converter 72.

As shown in FIG. 1, the vehicle 12 may include a low-voltage electrical distribution system (EDS) 74 (hereinafter "low-voltage EDS"). The low-voltage EDS 74 receives low-voltage electric power from the DC/DC converter 72 and distributes the low-voltage electric power to various low-voltage devices or components in the vehicle 12, such as the fan 30 in the HVAC system 22.

As depicted in FIG. 1, the vehicle 12 includes an engine control unit 76, which may include an electronic throttle control (ETC) system. The ETC regulates the flow of air and thus fuel vapor into the engine 54 thereby controlling torque that the engine 54 outputs. The engine 54 outputs torque to shaft 80 connected to the planetary gear set 62. The planetary gear set 62 receives the power from the engine 54 through shaft 80 and transfers the power either to the drive wheels 58 through gear set 68 or to the electric generator 64 through shaft 82. In addition to receiving power from the engine 54, the planetary gear set 62 can also receive power from the electric generator 64.

Referring to FIG. 1, the electric generator 64 can be used as either an electric motor, a machine that converts mechanical energy into electrical energy, or both. Operating as an electric motor, the electric generator 64 outputs torque to shaft 82, which is connected to the planetary gear set 62. Because the electric generator 64 can provide a reaction torque for the engine 54 via the planetary gear set 62, the electric generator 64 can control speed of the engine 54. Operating as a machine that converts mechanical energy into electric energy, the electric generator 64 outputs high-voltage electric power to the high-voltage EDS 70.

As shown in FIG. 1, the VSC 40 controls the electrostatic filtering system 14, the HVAC system 22, the transaxle 60, the low-voltage EDS 74, the engine 54, and the battery 56 through a communications bus or vehicle data bus (hereinafter "data bus"). The data bus 84 is in communication with various components of vehicle 12 including one or more controllers of the system 10, the transaxle 60, the low-voltage EDS 74, the engine 54, and the battery 56. The data bus 84 may be implemented as a controller area network (CAN), a local interconnect network (LIN), or any such suitable data-communication link that can transfer data between the VSC 40 and other devices in the vehicle 12.

The VSC 40 receives a number of inputs having information to operate the vehicle 12. For example, the VSC 40 receives driver inputs, such as filtering parameters from the user interface 48 for the electrostatic filtering system 14, acceleration pedal position, brake pedal position, transmission gear selection that indicates which gear the driver has selected (e.g., park, neutral, forward, or reverse). Furthermore, the VSC 40 receives non-driver inputs through the data bus 84, such as the speed of the engine 54, the power at the drive wheels, the air pressure signal from the air pressure sensor 44, the closure signal from the closure position sensor 46, the vehicle position signal from the positioning system 52, as well as signals from the user interface 48 for controlling the electrostatic filtering system 14, the HVAC system 22, and various components in the passenger compartment 34.

The VSC 40 uses the information from the inputs to control the electrostatic filtering system 14, the HVAC system 22, the transaxle 60, the low-voltage EDS 74, the DC/DC converter 72, the engine 54, the battery 56, as well as other devices in the vehicle 12. For example, the VSC 40 controls the various components in the vehicle 12 to provide the high-voltage electric power needed to power the electrostatic filtering system 14 as well as other loads, such as the heating and cooling systems 24, 26 in the HVAC system 22. For example, the VSC 40 can control the high-voltage electric power that the electric generator 64 outputs to the high-voltage EDS 70. In such an example, the VSC 40 may control the planetary gear set 62 as well as the speed at which the engine 54 rotates shaft 80. More specifically, the VSC 40 can determine or calculate an engine speed set point based on the high-voltage electric power needed and provide one or more commands to the engine 54 and the planetary gear set 62 to control the rotational speed of shaft 82 and therefore the output of electric power from the electric generator 64. Furthermore, the VSC 40 can communicate with the high-voltage EDS 70 to distribute the high-voltage electric power to the filtering system 14 and the DC/DC converter 72.

The VSC 40 controls the electrostatic filtering system 14 based on information stored in the memory 42 or received outside the VSC 40. For example, the VSC 40 can control the rate of air filtering of the filtering system 14 based on whether a closure in the automotive vehicle is open. In such an example, the VSC 40 receives and processes either the air pressure signal from the air pressure sensor 44, the closure signal from the closure position sensor 46, or both signals to determine whether a closure in the automotive vehicle is open. If a closure in the vehicle is open, then the VSC 40 can command the filtering system 14 to decrease the rate of air filtering. For example, the VSC 40 can control the rate of air filtering to zero when the VSC 40 determines that at least one of the closures is not closed. The VSC 40 can control the electrostatic filtering system 14 based on other the information as described in the method below.

Figure 2:
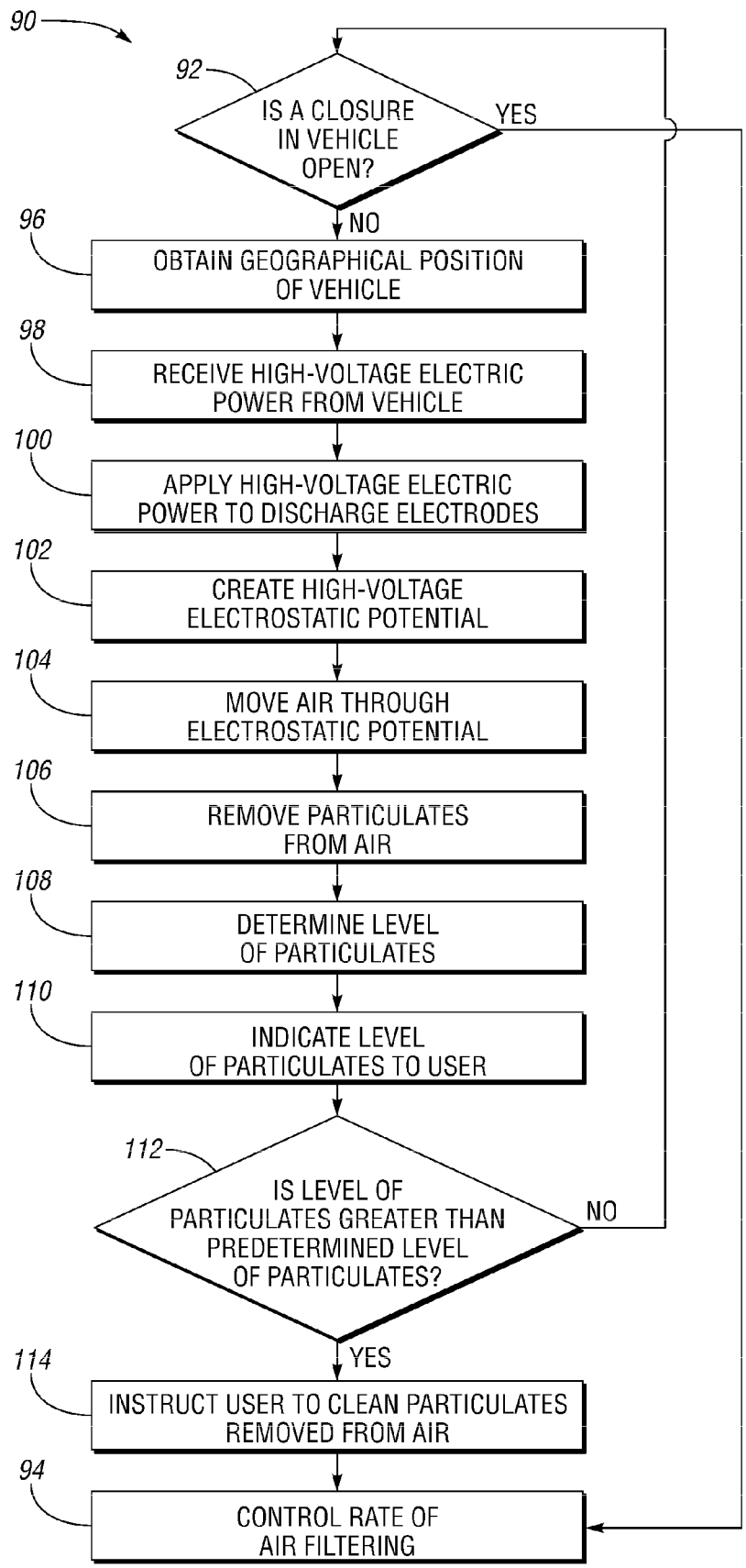
FIG. 2 is a flowchart diagram illustrating a method of electrostatic air filtering in the vehicle.

With reference to FIG. 2, a flowchart diagram 90 illustrating steps of a method of electrostatic air filtering in an automotive vehicle having high-voltage electric energy is generally provided. Electrostatic air filtering in an automotive vehicle can reduce or minimize an amount of particulates, debris, organisms, dust, mold, or other airborne particles that enter a passenger compartment in the vehicle. In addition to the steps shown in FIG. 2, a programmable logic device, such as the VSC 40, may be programmed with additional steps to provide additional functionality.

Referring again to FIG. 2, the vehicle 12 and its components illustrated in FIG. 1 are referenced throughout the discussion of the method to facilitate understanding of various aspects of the present invention. The method of electrostatic air filtering in an automotive vehicle may be implemented through a computer algorithm, machine executable code, or a software program programmed into a suitable programmable logic device(s) of the vehicle 12, such as the VSC 40, the engine control unit 76, the TCM 88, other controller in the vehicle 12, or a combination thereof. Although the various steps shown in the flowchart diagram 90 appear to occur in a chronological sequence, at least some of the steps may occur in a different order, and some steps may be performed concurrently or not at all.

At decision block 92 of flowchart diagram 90, whether a closure in the vehicle 12 is open is determined. The closure may be a window, door, moon roof, sun roof, or other type of sealing device. The VSC 40 can receive the air pressure signal from the air pressure sensor 44, the closure signal from the closure position sensor 46, or both signals to determine whether a closure in the vehicle 12 is open. If a closure in the vehicle 12 is open, then step 94 occurs and a rate of air filtering is controlled. In contrast, if a closure in the vehicle 12 is not open, then step 96 occurs.

At step 94, a rate of air filtering is controlled. The VSC 40 controls the rate of air filtering of the filtering system 14. For example, the VSC 40 may decrease the rate of air filtering to zero if decision block 92 determines a closure in the vehicle 12 is open. In another example, the VSC 40 may increase the rate of air filtering if the vehicle 12 is located in a geographic area having relatively poor air quality.

At step 96 of the flowchart diagram 90, a geographic position of vehicle 12 is obtained. For example, the geographic position of vehicle 12 may be defined by coordinates of where the vehicle 12 is positioned. The VSC 40 may receive and process the vehicle position signal from the positioning system 52 to obtain the geographical position of the vehicle 12.

At step 98, high-voltage electric power is received from the vehicle 12. The filtering system 14 can receive the high-voltage electric power from the electric generator 64, the electric motor 66, the battery 56, or a combination thereof through the high-voltage EDS 70.

At step 100, high-voltage electric power is applied to the discharge electrodes 16 in the filtering system 14. The filtering system 14 applies the high-voltage electric power to the discharge electrodes 16 under the control of the VSC 40.

At step 102, a high-voltage electrostatic potential is generated or established. The filtering system 14 generates the high-voltage electrostatic potential between the accumulation electrode 18 and the discharge electrodes 16.

At step 104, air is moved through the region of the high-voltage electrostatic potential generated in step 102. The filtering system 14, the HVAC system 22, or both the filtering system 14 and HVAC system 22 can move the air through the high-voltage electrostatic potential. For example, the fan 30 can move or propel the air through the high-voltage electrostatic potential and into the passenger compartment 34 in the vehicle 12.

At step 106, particulates are removed from the air of step 104. The filtering system 14 can remove the particulates from the air by using the electrostatic potential of step 102 to electrostatically transfer the particulates to the accumulation electrode 18.

At step 108, a level of particulates is determined. The VSC 40 can determine the level of particulates as an amount of particulates that has accumulated on the accumulation electrode 18. The VSC 40 can determine the level of particulates based on the first and second amounts of particulates that the particulate sensor system 20 senses.

At step 110 of flowchart diagram 90, the level of particulates is indicated to a user. The user interface 48 indicates or displays the level of particulates to the user, such as one of passengers 50.

At decision block 112, the level of particulates is compared to a predetermined level of particulates. The predetermined level of particulates may be stored in the memory 42. In addition, the predetermined level of particulates may be a level or degree of particulates that inhibits efficient operation of the electrostatic filtering system 14. The VSC 40 can compare the level of particulates determined in step 108 to the predetermined level of particulates to determine whether the level of particulates is greater than the predetermined level of particulates. If the level of particulates is not greater than the predetermined level of particulates, then decision block 92 occurs. However, if the level of particulates is greater than the predetermined level of particulates, then step 114 occurs.

At step 114, a user is instructed to clean the particulates removed from the air of step 104. For example, the user interface 48 may instruct one of the passengers 50 to clean the accumulation electrode 18 in the filtering system 14. Step 94 may occur after step 114.

Figure 3:
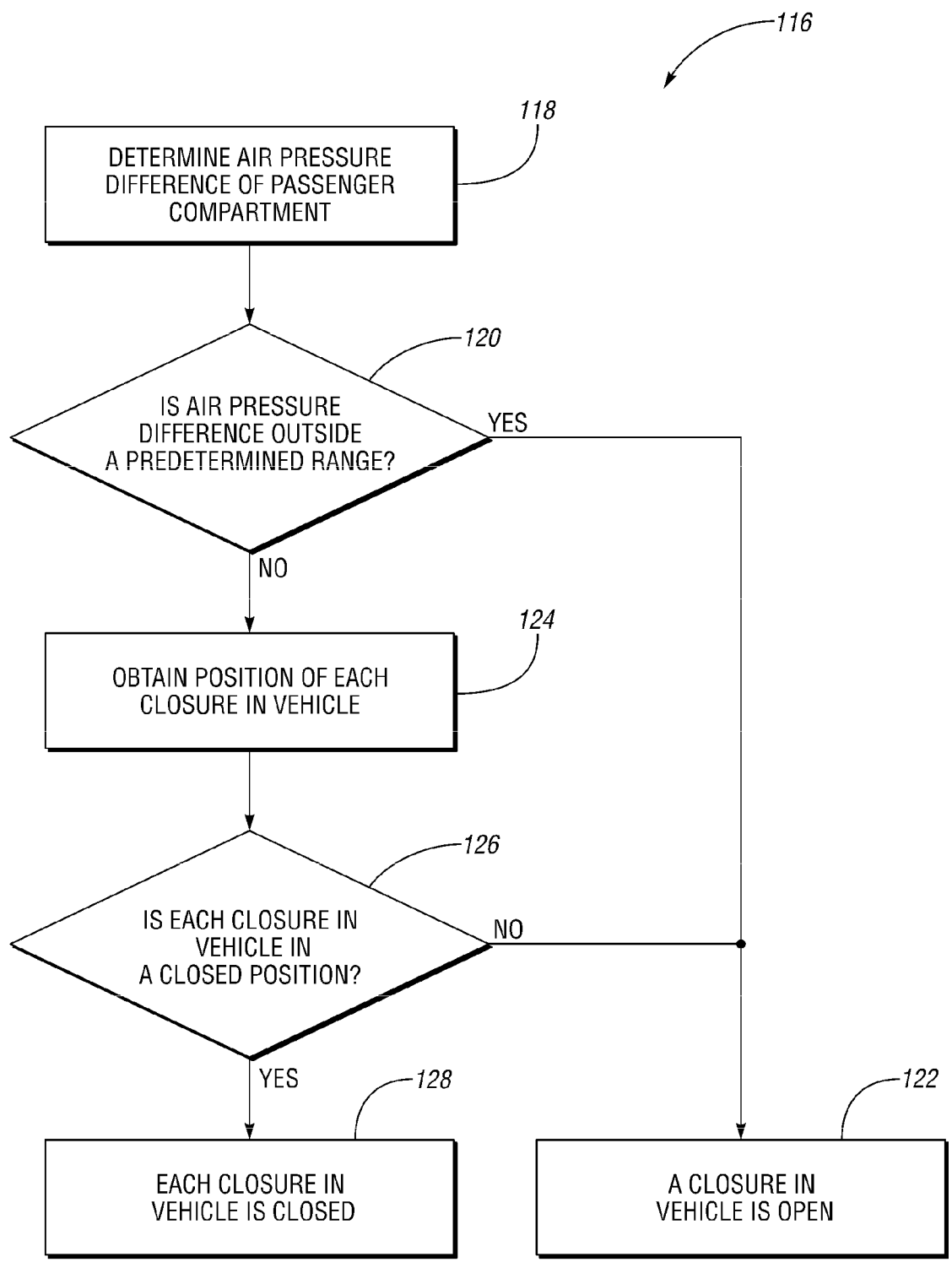
FIG. 3 is a flowchart diagram illustrating a method of determining whether a closure, such as a window, in the vehicle is open.

Referring to FIG. 3, a flowchart diagram 116 illustrating steps of a method of determining whether a closure in the vehicle 12 is open is provided. The method of determining whether a closure in the vehicle 12 is open may be implemented through a computer algorithm, machine executable code, or a software program programmed into a suitable programmable logic device(s) of the vehicle 12, such as the VSC 40 or other controller in the vehicle 12. Furthermore, the method of determining whether a closure in the vehicle 12 is open can be used in decision block 92 of FIG. 2. Although the various steps shown in the flowchart diagram 116 appear to occur in a chronological sequence, at least some of the steps may occur in a different order, and some steps may be performed concurrently or not at all.

At step 118 of FIG. 3, an air pressure difference of the passenger compartment 34 is determined. The VSC 40 can determine the air pressure difference based two or more air pressures that the air pressure sensor 44 senses in the passenger compartment 34. Alternatively, the VSC 40 can determine the air pressure difference based on the pressure difference between the internal and external air pressures of the vehicle 12.

At decision block 120, whether the air pressure difference determined in step 118 is outside a predetermined range is determined. The predetermined range may be stored in the memory 42. The VSC 40 can determine whether the air pressure difference is outside the predetermined range. If the air pressure difference is outside the predetermined range, then step 122 occurs. However, if the air pressure difference is not outside the predetermined range, then step 124 may occur.

At step 122, a closure in the vehicle 12 is determined to be open.

At step 124, a position of each closure that can open and close in the vehicle 12 is obtained. The closure position sensor 46 can be used for each closure to obtain the position of each closure in the vehicle 12.

At decision block 126, whether each closure is in a closed position is determined. The VSC 40 can determine whether each closure of step 124 is in a closed position based the closure signal from the closure position sensor 46 of each closure in the vehicle 12. If each closure is not in a closed position, then step 122 occurs. In contrast, if each closure is in a closed position, then step 128 occurs.

At step 128, each closure in the vehicle 12 is determined to be in the closed position.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A system for electrostatic air filtering in an automotive vehicle that includes a high-voltage energy storage device, an electric motor for powering the vehicle, and a passenger compartment, the system comprising:
    an electrostatic filtering system in the vehicle having a plurality of discharge electrodes, at least one accumulation electrode, and a sensor system to sense a first amount of particulates in air flowing upstream of the accumulation electrode and a second amount of particulates in air flowing downstream of the accumulation electrode; and
    an electrical distribution system in high-voltage electrical communication with the filtering system, the electric motor, and the high-voltage energy storage device to distribute high-voltage electric power from at least one of the electric motor and the high-voltage energy storage device to the filtering system;
    wherein the filtering system receives the high-voltage electric power from the distribution system to generate a high-voltage electrostatic potential between the accumulation electrode and the discharge electrodes to electrostatically transfer particulates from air flowing through a region of the electrostatic potential to the accumulation electrode, and increases or decreases a rate of air filtering in response to the first and second amounts of sensed particulates.

2. The system of claim 1 wherein the filtering system transfers the air flowing through the region of the electrostatic potential to the passenger compartment in the vehicle.

3. The system of claim 1 wherein the electrostatic filtering system generates a signal indicative of the first and second amounts of particulates, and determines a level of particulates that has accumulated on the accumulation electrode based on the signal indicative of the first and second amounts of particulates.

4. The system of claim 3 wherein the sensor system includes an optical particle counter.

5. The system of claim 1 wherein the filtering system receives information indicating whether a closure in the vehicle is open to control a rate of air filtering based on whether the closure in the vehicle is open.

6. The system of claim 1 wherein the electrostatic filtering system increases or decreases a rate of filtering in response to a signal indicative of a pressure of the passenger compartment of the vehicle.

7. The system of claim 1 wherein the electrostatic filtering system increases or decreases a rate of filtering in response to a signal indicative of a geographic location of the vehicle.

8. A system for electrostatic air filtering in an automotive vehicle including a high-voltage energy storage device, an electric motor for powering the vehicle, and a passenger compartment, the system comprising:
- an electrostatic filtering system in the vehicle having a plurality of discharge electrodes, at least one accumulation electrode, and a sensor system to sense amounts of particulates in air flowing upstream and downstream of the accumulation electrode;
- an electrical distribution system in high-voltage electrical communication with the filtering system, the electric motor, and the high-voltage energy storage device to distribute high-voltage electric power from at least one of the electric motor and the high-voltage energy storage device to the filtering system; and
- a controller in the vehicle configured to regulate the high-voltage electric power from the distribution system and apply the high-voltage electric power to the discharge electrodes so as to control a rate of air filtering in response to the amounts of particulates in air flowing upstream and downstream of the accumulation electrode, wherein the discharge electrodes create a high-voltage electrostatic potential and transfer particulates from air flowing through a region of the electrostatic potential to the accumulation electrode.

9. The system of claim 8 wherein the sensor system is configured to sense a first amount of particulates in air flowing upstream of the accumulation electrode and a second amount of particulates in air flowing downstream of the accumulation electrode, and to generate a signal determined by the first and second amounts of particulates, wherein the controller determines a level of particulates that has accumulated on the accumulation electrode based on the signal determined by the first and second amounts of particulates.

10. The system of claim 8 wherein the controller controls a heating ventilating and air conditioning (HVAC) system having a filter in the vehicle, the HVAC system moving air through the filter, through the electrostatic filtering system, and into the passenger compartment.

11. The system of claim 8 wherein the controller receives information indicating a geographical position of the vehicle from a positioning system in the vehicle, the controller processing the information to control a rate of air filtering in the vehicle.

12. The system of claim 8 wherein the controller receives information indicating an air pressure in the passenger compartment from an air pressure sensor, the controller processing the information to control a rate of air filtering in the vehicle.

13. The system of claim 12 wherein the controller controls the rate of air filtering when the air pressure in the passenger compartment is outside a predetermined pressure range.

14. The system of claim 8 wherein the controller receives information indicating position of one or more closures in the vehicle from one or more closure position sensors, the controller processing the information to control a rate of air filtering in the vehicle.

15. A method of air filtering in a vehicle electrostatic filtering system having an accumulation electrode and discharge electrodes, the method comprising:
- receiving high-voltage electric power from an electrical distribution system that distributes high-voltage electric power to the electrostatic filtering system from at least one of an electric motor, and a high-voltage energy storage device;
- sensing particulate amounts in air flowing upstream and downstream of the accumulation electrode;
- applying the high-voltage electric power to the discharge electrodes in response to the sensed particulate amounts to generate a high-voltage electrostatic potential between the accumulation electrode and the discharge electrodes; and
- moving air through a region of the electrostatic potential to remove particulates from the air to the accumulation electrode.

16. The method of claim 15 further including determining whether a closure in the vehicle is open and controlling a rate of air filtering based on whether the closure in the vehicle is open.

17. The method of claim 15 further including determining a geographical position of the vehicle and controlling a rate of air filtering based on the geographical position.

18. The method of claim 15 further including determining a level of particulates that has accumulated in the electrostatic filtering system.

19. The method of claim 18 further including sensing a first amount of particulates in air flowing upstream of the accumulation electrode; sensing a second amount of particulates in air flowing downstream of the accumulation electrode, generating a signal determined by the first and second amounts of particulates, processing the signal to determine the level of particulates based on the first and second amounts of particulates.

20. The method of claim 18 further including determining whether the level of particulates is greater than a predetermined level of particulates and instructing a user of the vehicle to clean the electrostatic filtering system if the level of particulates is greater than the predetermined level of particulates.

* * * * *